US008757557B2

(12) United States Patent
Brewer et al.

(10) Patent No.: US 8,757,557 B2
(45) Date of Patent: *Jun. 24, 2014

(54) ACTIVE GURNEY FLAP

(75) Inventors: Paul R. Brewer, Keynsham (GB);
Steven Shorcott, Thrupp Stroud (GB);
Reg R. Raval, Yatton (GB)

(73) Assignee: Claverham Ltd., Bristol (GB)

( * ) Notice: Subject to any disclaimer, the term of this patent is extended or adjusted under 35 U.S.C. 154(b) by 19 days.

This patent is subject to a terminal disclaimer.

(21) Appl. No.: 13/449,617

(22) Filed: Apr. 18, 2012

(65) Prior Publication Data

US 2012/0261508 A1 Oct. 18, 2012

(30) Foreign Application Priority Data

Apr. 18, 2011 (EP) .................................. 11250481

(51) Int. Cl.
*B64C 3/50* (2006.01)
(52) U.S. Cl.
USPC ............ 244/215; 244/17.13; 244/213; 416/1; 416/23
(58) Field of Classification Search
USPC .............................................. 244/215, 17.13
See application file for complete search history.

(56) References Cited

U.S. PATENT DOCUMENTS

| RE19,412 | E | 1/1935 | Zaparka |
| 5,294,080 | A * | 3/1994 | Ross .............................. 244/215 |
| 5,388,788 | A * | 2/1995 | Rudolph ....................... 244/215 |
| 5,492,448 | A | 2/1996 | Perry et al. |
| 5,518,210 | A | 5/1996 | Friberg |
| 6,010,307 | A | 1/2000 | McCabe |
| 6,030,179 | A | 2/2000 | McCabe |
| 6,039,533 | A | 3/2000 | McCabe |
| 6,132,181 | A | 10/2000 | McCabe |
| 6,168,379 | B1 | 1/2001 | Bauer |
| 6,474,945 | B1 * | 11/2002 | Nakasato et al. ................ 416/23 |
| 6,565,045 | B1 * | 5/2003 | Correge et al. ................ 244/215 |
| 6,843,452 | B1 * | 1/2005 | Vassberg et al. .............. 244/203 |
| 6,863,245 | B2 | 3/2005 | Gessler et al. |
| 7,338,011 | B2 * | 3/2008 | Pauly .......................... 244/99.14 |
| 7,410,133 | B2 * | 8/2008 | Lee et al. ....................... 244/215 |
| 7,610,841 | B2 * | 11/2009 | Padan ........................... 89/1.815 |

(Continued)

FOREIGN PATENT DOCUMENTS

DE 9113090 U1 1/1992
DE 102006036389 A1 4/2008

(Continued)

OTHER PUBLICATIONS

Extended European Search Report for EP11250481 mailed on Sep. 21, 2011.

(Continued)

*Primary Examiner* — Christopher P Ellis
*Assistant Examiner* — Medhat Badawi
(74) *Attorney, Agent, or Firm* — Carlson, Gaskey & Olds, P.C.

(57) ABSTRACT

According to an embodiment disclosed herein, a gurney flap assembly includes an actuator, and a flexible body attaching to the actuator, the body having a downwardly depending flap for moving into and out of an airstream in a pressure side of a wing, wherein the flexible body flexes in reaction to motion of the actuator. This increases the lift force of the rotor blade, wing or aerofoil blade.

24 Claims, 4 Drawing Sheets

(56) References Cited

U.S. PATENT DOCUMENTS

| | | |
|---|---|---|
| 7,740,205 B1 | 6/2010 | Nahas |
| 7,740,206 B2 | 6/2010 | Eaton et al. |
| 8,191,826 B2 * | 6/2012 | Daynes et al. ............... 244/99.8 |
| 2003/0102410 A1 * | 6/2003 | Gessler et al. ................ 244/215 |
| 2003/0218102 A1 * | 11/2003 | Van Dam et al. ............. 244/215 |
| 2005/0242234 A1 * | 11/2005 | Mahmulyin .................. 244/75.1 |
| 2007/0221789 A1 | 9/2007 | Lee et al. |
| 2009/0123224 A1 * | 5/2009 | Dazet ............................ 403/143 |
| 2009/0263252 A1 | 10/2009 | Slot |
| 2009/0302167 A1 * | 12/2009 | Desroche ................... 244/199.4 |
| 2009/0321582 A1 * | 12/2009 | Eaton et al. ................... 244/215 |
| 2010/0164249 A1 * | 7/2010 | Nusbaum .................... 296/180.4 |
| 2010/0209258 A1 | 8/2010 | Fuglsang et al. |
| 2010/0278657 A1 | 11/2010 | Kildegaard |
| 2011/0168835 A1 * | 7/2011 | Oliver .......................... 244/12.4 |
| 2011/0210883 A1 * | 9/2011 | Mohamadi ...................... 342/21 |
| 2011/0272532 A1 * | 11/2011 | Matsuda ........................ 244/215 |
| 2012/0195764 A1 * | 8/2012 | Fuglsang et al. ........... 416/223 R |
| 2012/0292945 A1 * | 11/2012 | Nusbaum .................... 296/180.4 |

FOREIGN PATENT DOCUMENTS

| | | |
|---|---|---|
| EP | 0939029 A2 | 9/1999 |
| EP | 1085152 A2 | 3/2001 |
| EP | 1488998 A1 | 12/2004 |
| EP | 2316732 A2 | 5/2011 |
| FR | 2792285 A1 | 10/2000 |

OTHER PUBLICATIONS

Extended Search Report for EP 11250480 mailed on Sep. 21, 2011.
Extended Search Report for EP11250479 mailed Aug. 3, 2011.
US Patent Application Title: "Active Gurney Flap" U.S. Appl. No. 13/449,749, filed Apr. 18, 2012.
US Patent Application Title: "Active Gurney Flap" U.S. Appl. No. 13/449,909, filed Apr. 18, 2012.

* cited by examiner

//ACTIVE GURNEY FLAP

CROSS-REFERENCE TO RELATED APPLICATION

This application claims priority to European Application No. 11250481.6, filed Apr. 18, 2011.

BACKGROUND

This application relates to Gurney flaps and more particularly to active Gurney flaps.

A Gurney flap is a small flat tab projecting from a trailing edge area of a wing. Typically the Gurney flap is set at a right angle to the pressure side surface of the airfoil, and projects up to 2% of the wing chord. The chord wise position is typically between 0.9 chord to the extreme trailing edge when measured from the leading edge. This trailing edge will improve airfoil lift.

The Gurney flap operates by increasing pressure on the pressure side of the wing that increases the lift force and may be used in auto racing, helicopter rotors, horizontal stabilizers, and high drag aircraft that take advantage of the resultant lift force.

The Gurney flap typically increases the drag coefficient, especially at low angles of attack, although for thick airfoils, a reduction in drag has been reported. A net benefit in overall lift to drag ratio is possible if the flap is sized appropriately based on the boundary layer thickness.

SUMMARY

According to an embodiment disclosed herein, a gurney flap assembly includes an actuator, and a flexible body attaching to the actuator, the body having a downwardly depending flap for moving into and out of an airstream on the pressure side of a wing, wherein the flexible body flexes in reaction to motion of the actuator.

According to a further embodiment disclosed herein, a gurney flap assembly for a rotary wing aircraft has a wing having a pressure side, a suction side, a trailing edge and a hollow portion between the pressure side and the suction side. The hollow portion is adjacent the trailing edge of the wing. An actuator is disposed within the hollow portion of the wing. The actuator attaches to a flexible body that is shown attached to the pressure side of the wing but would also perform the necessary task if attached to the suction side. The flexible body flexes in response to the actuator to move a downwardly depending flap into and out of an airstream in the pressure side.

According to a still further embodiment disclosed herein, a method for controlling performance of a rotary-winged aircraft, has the steps of providing a wing having a pressure side and a suction side, disposing an actuator in the wing, flexing a flexible body that is attached to the pressure side to move a downwardly depending flap into and out of an airstream in a pressure side of a wing in response to motion of the actuator.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
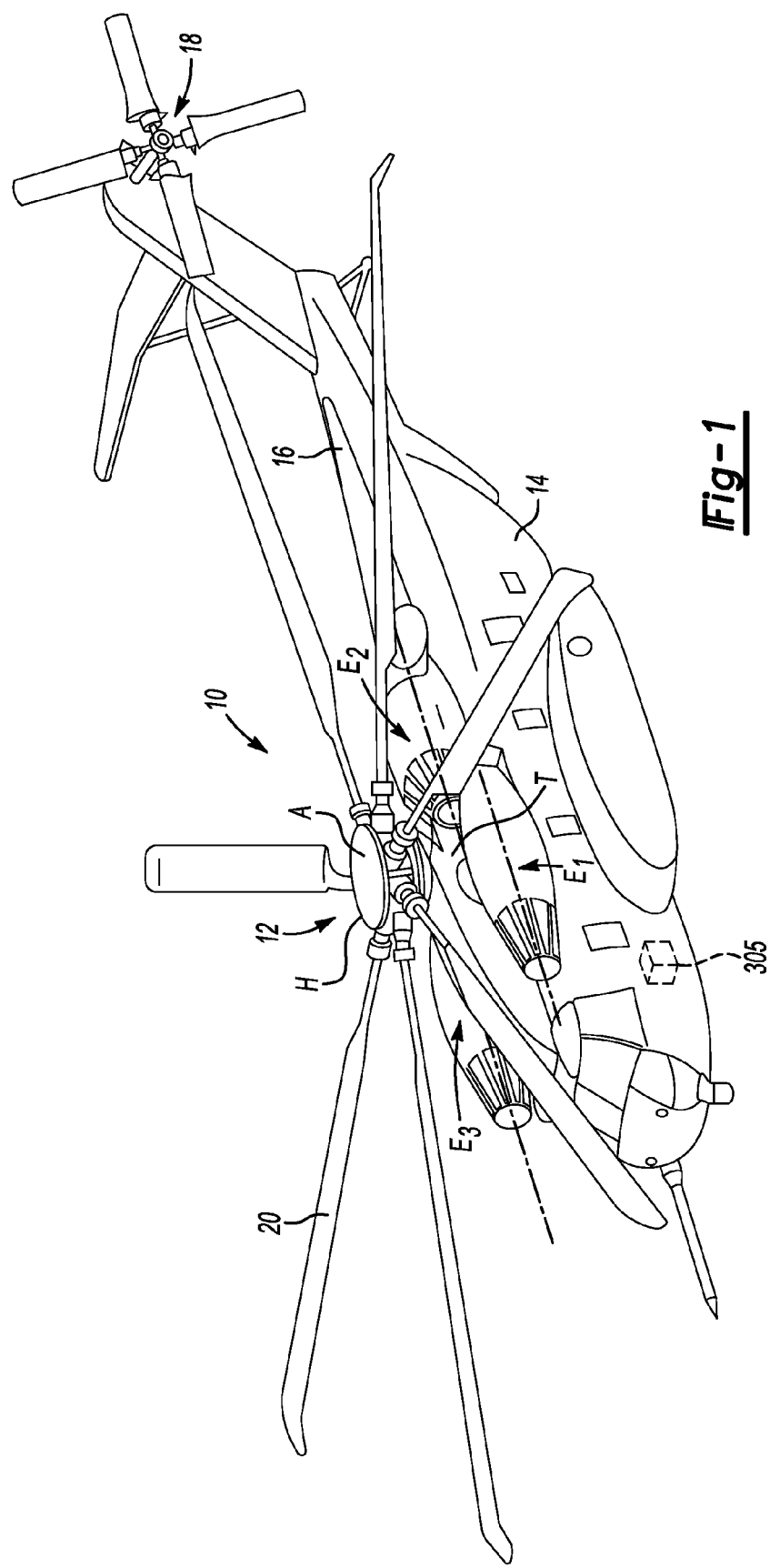
FIG. 1 shows an example helicopter.

FIG. 1 schematically illustrates an example of a rotary-wing aircraft 10 having a main rotor system 12. The aircraft 10 includes an airframe 14 having an extending tail 16 which mounts a tail rotor system 18, such as an anti-torque system. The main rotor assembly 12 is driven about an axis of rotation A through a main gearbox (illustrated schematically at T) by one or more engines E. The main rotor system 12 includes a multiple of rotor blade assemblies 20 mounted to a rotor hub H. Although a particular helicopter configuration is illustrated and described in the disclosed non-limiting embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, may also benefit from the present invention.

Figure 2:
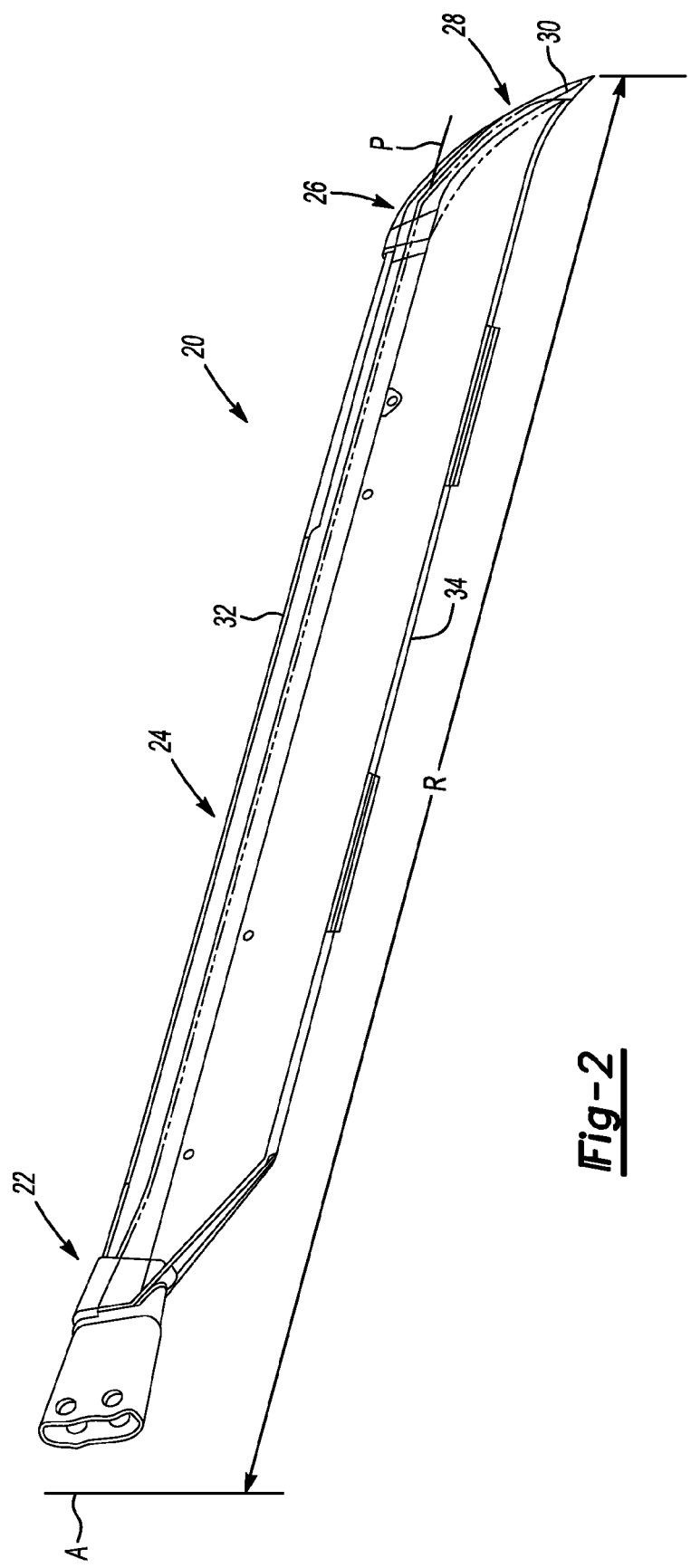
FIG. 2 shows an embodiment of a rotary wing of the helicopter of FIG. 1.

Referring to FIG. 2, each rotor blade assembly 20 of the rotor assembly 12 generally includes a root section 22, an intermediate section 24, a tip section 26 and a tip cap 28. Each rotor blade section 22, 24, 26, 28 may define particular airfoil geometries to particularly tailor the rotor blade aerodynamics to the velocity increase along the rotor blade span. The rotor blade tip section 26 may include an anhedral form though any angled and non-angled forms such as cathedral, gull, bent, and other non-straight forms will benefit from the present invention.

The rotor blade sections 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34. The distance between the leading edge 32 and the trailing edge 34 defines a main element chord length C.

Figure 3:
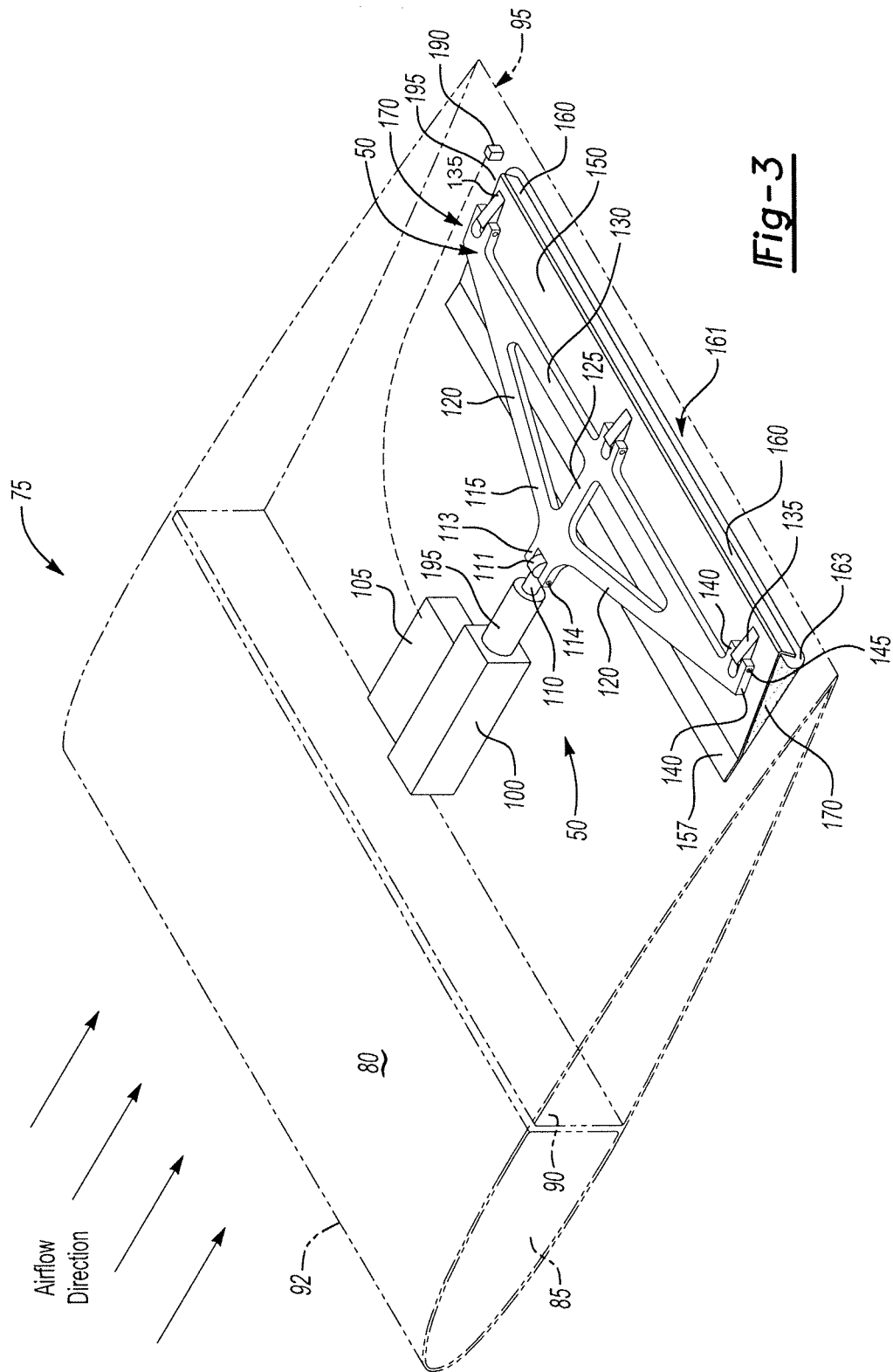
FIG. 3 shows a sectional view of the aircraft wing of FIG. 2 partially in phantom and the Gurney flap assembly.

Referring now to FIG. 3, a perspective view of a Gurney flap assembly 50 is shown. The helicopter wing 75 has a pressure side 85, a suction side 80, a support beam or spar 90, deposed between the pressure side 85 and the suction side 80, a leading edge 92 and a trailing edge 95.

The Gurney flap assembly 50 is disposed between the pressure side 85 and the suction side 80 aft of the support beam 90 and has an actuator 100, a controller 105, an actuator output 110, such as a piston rod that is reciprocated by the actuator 100. The controller 105 can be located in close proximity to the actuator 100 or located remotely from the actuator 100. The actuator output 110 has an eye end assembly item 111 that fits within ears 113 of a yolk assembly 115 and is anchored thereto by a pin 114 that passes through the ears 113 and the eye end assembly item 111. The actuator 100 can be mounted span wise by the addition of a suitable bell crane mechanism (not shown).

The yolk assembly 115 has a pair of angled arms 120, a central support 125 that extends from the ears 113 through the angled arms 120 and attaches to a perpendicularly disposed bottom support 130. As shown in this embodiment, the bottom support 130 has three sets of bosses 140 through which a pin 145 grips a protrusion 135 of a Gurney flap 150.

The Gurney flap 150 has a flexible body 155 having a forward edge 157 that attaches to the pressure side 85 of the wing 75 as will be discussed infra. The flexible body 155 has a flap 160 extending downwardly from a trailing edge 161 thereof in close proximity of the trailing edge 95. The Gurney flap 150 is disposed in a rectangular cut-out or slot 163 of the pressure side 85. A brush seal 170, or the like, is disposed at either side of the extending flap 160 to minimize a passage of debris into a chamber 171 between the pressure side 85 and the suction side 80 (see FIGS. 4, 5). Such debris might damage the actuator 100 or the controller 105 or the Gurney flap assembly 50. Though shown on a pressure side of a wing, the flaps may also attach to other areas of the wing including the suction side.

Figure 4:
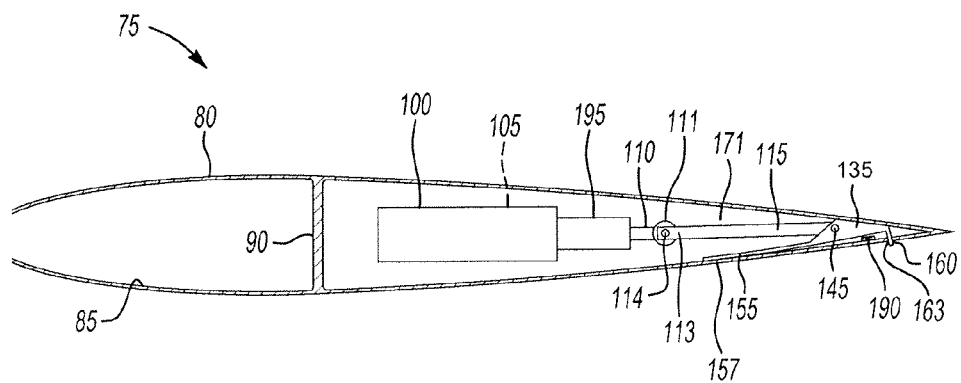
FIG. 4 shows a side view of FIG. 3 in a retracted position.

Referring now to FIG. 4, a side view of the Gurney flap assembly of FIG. 3 is shown in a retracted position. In this position, the actuator output 110 is retracted thereby pulling the eye end assembly item 111 forward thereby pulling the Gurney flap 150 upwardly into the wing 75 such that the Gurney flap assembly 50 pulls its flap edge 160 out of the air stream that travels along the pressure side 85 of the wing 75 in a stowed position. The forward edge 157 of the flexible body 155 is attached to the inner surface of the pressure side 85 by adhesive or other appropriate means such as riveting or the like. While the actuator 100 moves the actuator output 110 linearly, the yoke assembly 115 translates this motion into a rotary motion of the flexible body 155 about its forward edge 157 attachment with the pressure side of the wing 75. This rotary motion causes the flap to move in and out of deployment in the cut out 163.

Figure 5:
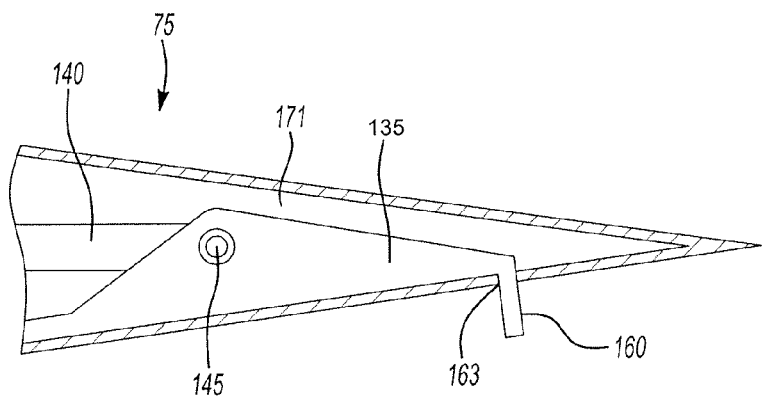
FIG. 5 shows a deployed view of the Gurney flap of FIG. 4 side.

Referring to FIG. 5 and FIG. 3, an activated position (e.g., deployed position), the actuator 100 pushes the yolk assembly 115 aft thereby urging the legs 120 and the support 125 forward and downward to push the flap edge 160 into the air stream through a slot along the trailing edge 95 of the wing 75.

A first position sensor 195 is placed schematically around the actuator output 110 that informs the controller 105 as to the position of the flap 160 via the Gurney flap assembly 50. In addition, a second optional sensor 190, which communicates with the controller 105, is placed in close proximity to the edge 195 of the Gurney flap 150. The second sensor 190 allows the controller to fine tune the position of the Gurney flap 150 should the wing 75 encounter excessive bending or other moments and the second sensor 190 provides a degree of redundancy should it or the first sensor 195 fail. The first and second sensors 195, 190 in conjunction with the controller 105 permit the aircraft 10 to rapidly modulate the position of the flap 160 to allow the helicopter wing 75 to provide a desired or even magnified mode of operation. The actuator 100 is designed to provide sinusoidal operation or full stowing/deployment with steady holding states between movements. For instance, if control is collective, a deployed flap 160 may allow a wing 75 to provide more lift relative to a wing without a deployed flap 160 and a stowed flap has minimal effect on the functionality of the wing 75. If control is cyclic, the actuator 100, at the behest of the controller 105, may modulate the flap 160 inwardly and outwardly to match the cyclic action required of the wing 75 and may even magnify the action of the wing 75 by providing more lift if the flap 160 is deployed. The controller 105 may compare signals from the first sensor 195 and the second sensor 190 to test whether the flap 160 is actually in a desired position and may reset the yoke assembly 150 to place the flap 160 in a desired position. Similarly, a second controller 305 in the aircraft 10 (see FIG. 1.) may compare the output of controller 105 with the expected performance of the wing 75 or the aircraft 10 and direct the controller 105 to position the yoke assembly 115 to position the flap 160 so that required performance is met.

The flexible body 150 and the flap 160 are made out of a flexible material such as a thin metal or a composite or the like. The flap 160 stiffness may be enhanced by the addition of local reinforcing. The thin metal or other composite is freely bendable to allow the actuator 100 to move the Gurney flap without producing distortions or undulations into the surface of the wing 75.

The assembly can be used in helicopter rotor blade primary control and higher harmonic applications. Also, multiple gurney flaps assemblies can be incorporated into rotor blade span to provide redundancy.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gurney flap assembly, said flap assembly comprising:
an actuator, and
a flexible body, said body having a downwardly depending flap for moving into and out of an airstream in a pressure side of a wing,
wherein said flexible body is configured to flex in reaction to motion of said actuator into a deployed position generally flush with a pressure side of a wing.

2. The assembly of claim 1 further comprising:
a controller to command said actuator, and
a first sensor for determining a position of said actuator, said first sensor communicating with said controller.

3. The assembly of claim 2 further comprising:
a second sensor placed in close proximity to said flap for determining a position of said flap and communicating with said controller.

4. The assembly of claim 2 further comprising a second controller communicating with said controller, said second controller compares performance of a wing and directs said controller to position said flap in response to such comparison.

5. The assembly of claim 1 further comprising:
a seal along an edge of said flexible body or downward depending flap.

6. The assembly of claim 1 further comprising a yoke connecting said actuator to said flexible body.

7. The assembly of claim 6 wherein said yoke comprises a pair of arms and a support connecting said arms, said support attaching to said flexible body.

8. The assembly of claim 6 wherein said actuator attaches to said yoke by means of a rotatable connection.

9. A gurney flap assembly for a rotary wing aircraft comprising:
a wing having a pressure side, a suction side, a trailing edge and a hollow portion between said pressure side and said suction side and adjacent said trailing edge of said wing,
an actuator disposed within said hollow portion of said wing, and
a flexible body attaching to said actuator, said body having a flap for moving into and out of an airstream in said pressure side, and wherein said flexible body flexes in reaction to motion of said actuator into a deployed position generally flush with said pressure side of said wing.

10. The assembly of claim 9 wherein said flexible body is disposed in a cutout or slot in said pressure side of said wing.

11. The assembly of claim 9 further comprising:
a controller to command said actuator, and
a first sensor for determining a position of said actuator, said first sensor communicating with said controller.

12. The assembly of claim 11 further comprising:
a second sensor placed in close proximity to said flap for determining a position of said flap, said second sensor communicating with said controller.

13. The assembly of claim 9 further comprising a yoke connecting said actuator to said flexible body.

14. The assembly of claim 13 wherein said yoke comprises a pair of arms and a support connecting said arms, said support attaching to said flexible body.

15. The assembly of claim 9 wherein said actuator attaches to said yoke by means of a rotatable connection.

16. The assembly of claim 9 further comprising a controller that compares position data of said flap with performance of said aircraft and provides a signal to change position of said flap in response to performance of said aircraft.

17. A method for controlling performance of a rotary-winged aircraft, said method comprising:
providing a wing having a pressure side and a suction side, disposing an actuator in said wing,
flexing a flexible body attaching to said pressure side to move a downwardly depending flap into and out of an airstream in said pressure side of said wing in response to motion of said actuator wherein said flexible body is generally flush with said pressure side of said wing in a deployed position.

18. The method of claim 17 further comprising:
sensing from a first sensor a first position of said actuator.

19. The method of claim 18 further comprising:
sensing from a second sensor a second position of said flap; and
comparing said first position of said flap with said second position of said flap.

20. The method of claim 17 further comprising:
comparing position data of said flap from a controller with performance of said aircraft; and
providing a signal to change position of said flap to said controller in response to performance of said aircraft.

21. The assembly of claim 1 wherein a first portion of said flexible body is configured to remain fixed in reaction to motion of said actuator and a second portion of said flexible body flexes in reaction to motion of said actuator.

22. The assembly of claim 1 wherein said downwardly depending flap is generally perpendicular to said flexible body.

23. The assembly of claim 9 wherein said flap extends in a direction generally perpendicular to said pressure side of said wing.

24. The assembly of claim 9 wherein said flap is spaced from said trailing edge of said wing when in a fully retracted position.

* * * * *